United States Patent
Bonissone et al.

[11] Patent Number: 5,995,737
[45] Date of Patent: Nov. 30, 1999

[54] SYSTEM AND METHOD FOR TUNING A RAIL-BASED TRANSPORTATION SYSTEM SPEED CONTROLLER

[75] Inventors: Piero Patrone Bonissone, Schenectady; Yu-To Chen; Pratap Shankar Khedkar, both of Niskayuna, all of N.Y.

[73] Assignee: General Electric Company, Schenectady, N.Y.

[21] Appl. No.: 08/924,972

[22] Filed: Sep. 8, 1997

[51] Int. Cl.[6] ........................................................ B60T 8/58
[52] U.S. Cl. ................................ 395/500.29; 395/500.23; 364/148.05; 364/166; 701/20; 701/98; 706/13; 303/135
[58] Field of Search ............................... 395/500, 500.23, 395/500.29; 364/148.01, 150–152, 166, 148.02, 148.05, 578; 701/40, 19–20, 98; 303/128–136; 706/1–9, 13, 52

[56] References Cited

PUBLICATIONS

"Genetic Algorithms for Automated Tuning of Fuzzy Controllers: A Transportation Application" by Piero P. Bonissone, et al, Fifth IEEE International Conference on Fuzzy Systems, Sep. 1996, New Orleans, LA, pp. 674–680.

"Automated Fuzzy Knowledge Base Generation and Tuning" by DG Burkhardt, et al, 1992 IEEE, San Diego, CA, pp. 179–188.

"A Classified Review on the Combination Fuzzy Logic–Genetic Algorithms Bibliography" by O. Cordon, et al, Research Report DESCAI95129, Dept. of Computer Science and AI, Universidad de Granada, Granada, Spain, 1995, 21 pages.

"Tuning Fuzzy Logic Controllers by Genetic Algorithms" by F. Herrera, et al, Int. Journal Approximate Reasoning (IJAR), vol. 12, Nos. 3/4, Apr./May 1995, PP–299–315.

"Fuzzy Control of pH using Genetic Algorithms" by CL Karr, et al, IEEE Transactions on Fuzzy Systems, vol. 1. No. 1, Feb. 1993, pp. 46–53.

"Modifications of Genetic Algorithms for Designing and Optimizing Fuzzy Controllers" by J. Kinzel, et al, 1994 IEEE Conference on Evolutionary Computation, Orlando, FL, vol. 1, pp. 28–33.

"Integrating Design States of Fuzzy Systems Using Genetic Algorithms", by MA Lee, et al, IEEE Conference on Fuzzy Systems, vol. 1, 1993, San Francisco, CA, pp. 612–617.

"Fuzzy Identification of Systems and Its Applications to Modeling and Control" by T. Takagi, et al, IEEE Trans. on Systems, Man and Cybernetics, vol. SMC–15, No. 1, 1985, pp. 116–132.

"A Practical Guide to Tune of Proportional and Integral (PI) Like Fuzzy Controllers" by L. Zeng, 1992 IEEE Conference on Fuzzy Systems, San Diego, CA, pp. 633–640.

"Design of an Adaptive Fuzzy Logic Controller Using a Genetic Algorithm" by CL Karr, In Proc Int. Conf on Genetic Algorithms (ICGA '91), vol. 1, pp. 450–456, San Diego, CA 1991.

*Primary Examiner*—Kevin J. Teska
*Assistant Examiner*—Russell W. Frejd
*Attorney, Agent, or Firm*—David C. Goldman; Jill M. Breedlove

[57] ABSTRACT

In this invention there is disclosed a system and method for tuning a speed controller that is used to keep a rail-based transportation system within a prescribed speed limit while providing a smooth ride. A fuzzy logic controller is synthesized to track the performance of a train simulator to a predetermined velocity profile over a specified track profile. A genetic algorithm is used to adjust the fuzzy logic controller's performance by adjusting its parameters in a sequential order of significance.

16 Claims, 7 Drawing Sheets

SYSTEM AND METHOD FOR TUNING A RAIL-BASED TRANSPORTATION SYSTEM SPEED CONTROLLER

FIELD OF THE INVENTION

The present invention relates generally to rail-based transportation system speed controllers and more particularly to a system and method for designing and tuning a rail-based transportation system speed controller.

BACKGROUND OF THE INVENTION

A rail-based transportation system such as a freight train typically comprises at least one locomotive and about one hundred rail-cars connected together by inter-car couplers. Most of the couplers that are currently used are connected to the rail-cars by a hydraulically damped spring. Since each of the couplers are connected to a hydraulically damped spring at opposite ends, there is a slack zone that allows the rail-cars to move relative to each other while in motion, allowing the train to change length by as much as 50–100 feet. For example, the slack zone will decrease to zero while the train is traveling downhill and using dynamic braking and will expand to its maximum length while the train is traveling uphill. The amount of movement allowed by the couplers depends on the handling of the locomotive controls. Typically, the couplers are subjected to two types of forces (i.e., static and dynamic) that may lead to breakage of the couplers, the brake pipe that prevents the rail-cars from banging in to each other, and the train. Accordingly, the train operator has to be careful in the handling of the locomotive controls so that these forces are not exceeded. In addition, the train operator has to control the locomotive so that the train travels within prescribed speed limits without excess acceleration and braking. Violation of the prescribed speed limits and excess acceleration and braking may lead to derailments and severe cargo damage. Therefore, it is imperative that the train operator handle the locomotive controls smoothly while staying within the prescribed speed limits.

Currently, most locomotives are equipped with only a very simplistic cruise control that uses a linear Proportional Integral (PI) controller. This type of cruise control can only be used below speeds of 10 mph and is primarily used for uniform loading and yard movement and cannot prescribe a braking action. In addition, this type of PI controller does not take into account the slack or distributed dynamics of the couplers in any manner and is not applicable for extended trains traveling at cruising speeds over a variety of terrain. Accordingly, there is a need for a speed controller that can smoothly manage the slack of the couplers while keeping the train within prescribed speed limits over a varying terrain.

SUMMARY OF THE INVENTION

This invention has developed a system and method for tuning a speed controller that is used to keep a rail-based transportation system within prescribed a speed limit, while smoothly managing the slack of the couplers between the rail-cars. In this invention, there is a velocity profiler containing a predetermined velocity profile for operating a rail-based transportation system over a specified track profile. In addition, there is a train simulator for simulating an operation of the rail-based transportation system over the specified track profile. A fuzzy logic controller controls the velocity of the train simulator in accordance with the predetermined velocity profile provided by the velocity profile. In particular, the fuzzy logic controller tracks the error and change in tracking error between the velocity of the train simulator and the predetermined velocity profile and provides a control action to the train simulator that minimizes the tracking error. A tuner, coupled to the train simulator and the fuzzy logic controller, optimizes the tracking between the train simulator and the predetermined velocity profile provided by the velocity profiler.

DETAILED DESCRIPTION OF THE INVENTION

Figure 1:
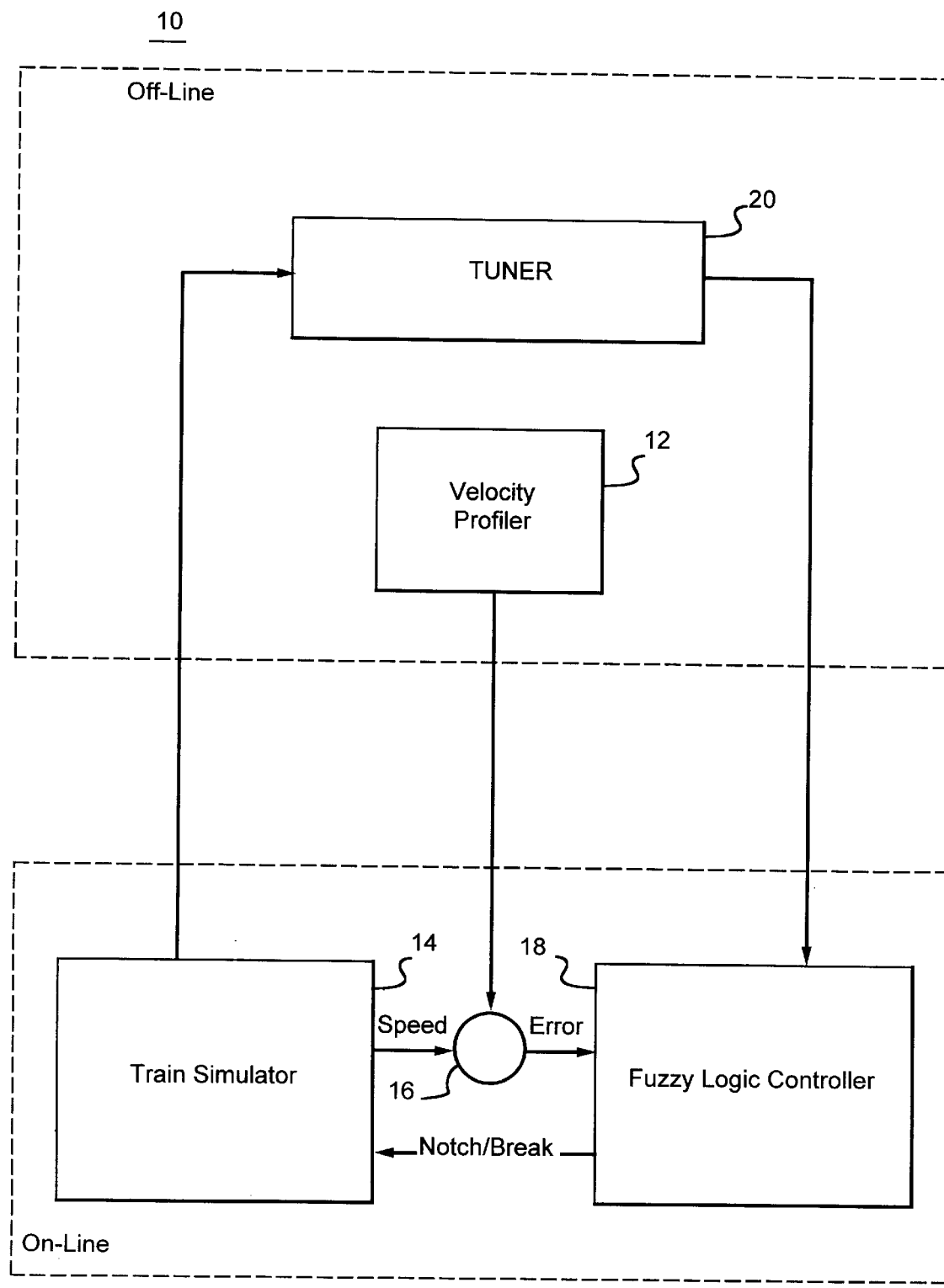
FIG. 1 shows a block diagram of a system for tuning a rail-based transportation speed controller according to this invention.

FIG. 1 shows a block diagram of a system 10 for tuning a rail-based transportation speed controller according to this invention. The system 10 includes a velocity profiler 12 that contains a predetermined velocity profile for operating a rail-based transportation system such as a freight train over a specified track profile. A train simulator 14 is used to simulate the operation of the train over the specified track profile. A comparator 16 compares the speed of the train simulator 14 at various locations of the specified track profile to the predetermined velocity that is stored within the velocity profiler 12. The comparator 16 sends an error signal corresponding to the tracking error between the speed of the train simulator 14 and the predetermined velocity profile. A fuzzy logic controller 18 uses the tracking error and change in tracking error to generate a control action to the train simulator 14 that minimizes the tracking error. In this invention, the control action is the modification of the throttle notch and brake settings. A tuner 20, coupled off-line to the train simulator 14 and the fuzzy logic controller, is used to optimize the controller's ability to tracking the train simulator with the predetermined velocity profile.

In this invention, the velocity profiler 14 comprises a track profile of several different tracks. The track profile includes the grade of the track, the elevation of the track, the curvature of the track, the speed limits, as well as any landmarks, the grade crossings, bridges and so forth. In addition, the velocity profiler 14 comprises a train makeup of the train. The train makeup includes the number of rail-cars, the type of rail-cars, the position and lading of each rail-car, and the type of each locomotive in the consist. A train dynamics model uses the track profile and train makeup information to generate the acceleration of the train from a locomotive tractive or braking force, grade forces on the train, and resistance forces due to aerodynamic drag, track curvature, and wheel rail friction. An optimization algorithm optimizes the train dynamics model to find the function of the tractive effort versus position or time that results in the completion of the journey in a specified time with minimized fuel consumption. The result of the optimization algorithm is the optimal velocity profile for operating the train over the specified track profile.

In this invention, the train simulator 14 simulates the operation of the train based on three inputs, the locomotive characteristics, the train makeup and the track profile. The locomotive characteristics specify the tractive/braking effort available at a given velocity and notch setting. The locomotive characteristics also contains a specific fuel consumption table which are specific to each make of locomotive and can be varied suitably. The train makeup is comprised of a list of rail-cars and/or locomotives, arranged in sequential order within the train. The type of the car and the amount of lading has to be specified for each car. The empty weight and other physical characteristics of the rail-car such as cross-sectional area, Davis coefficients etc. are inferred from the car type, and are maintained in a separate database. The track profile comprises a list of mileposts along the specified track, with the distance from the starting point, the current grade in percent, curvature in degrees, and the speed limit in mph. The beginning and end of the journey is marked either by special milepost designations or by a speed limit of zero. The train simulator uses the above-noted inputs to generate outputs such as time in minutes, the throttle notch setting having a range from 0–8, the dynamic brake setting having a range from 0–8, the air brake setting in psi, the distance traveled in miles, the velocity in mph, the net acceleration in mph/min, the total cumulative fuel consumed in gallons, the net elevation in miles, the tractive effort in lb-ft, the total braking effort (dynamic+air) in lb-ft, the air brake effort in lb-ft, and the reference velocity in mph. This list of outputs is only illustrative of the possibilities and this invention is not limited thereto.

Figure 2:
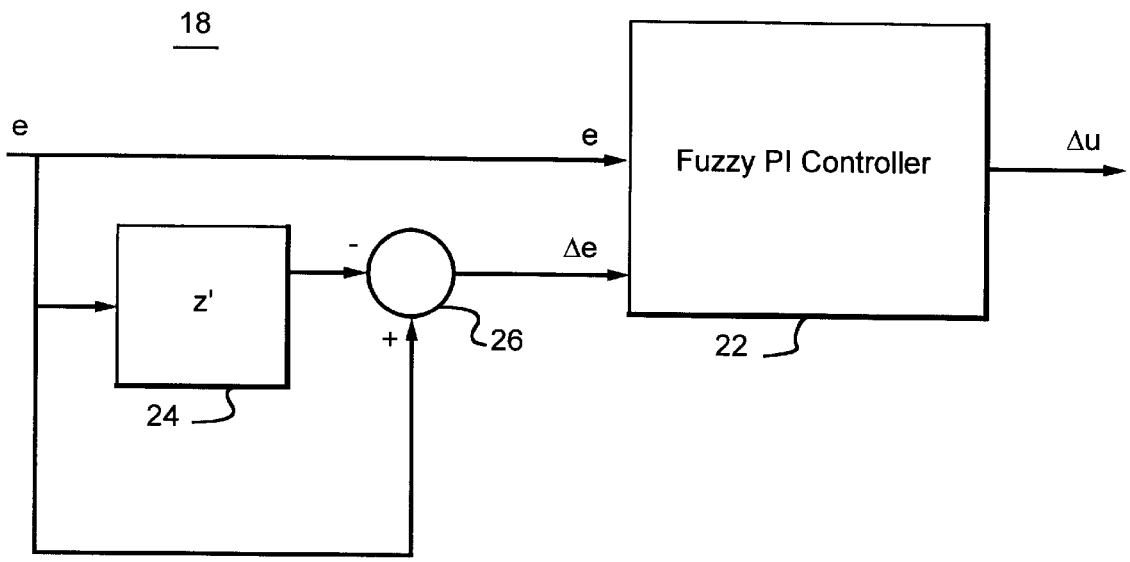
FIG. 2 shows a block diagram of a more detailed view of the fuzzy logic controller shown in FIG. 1.
Figure 3:
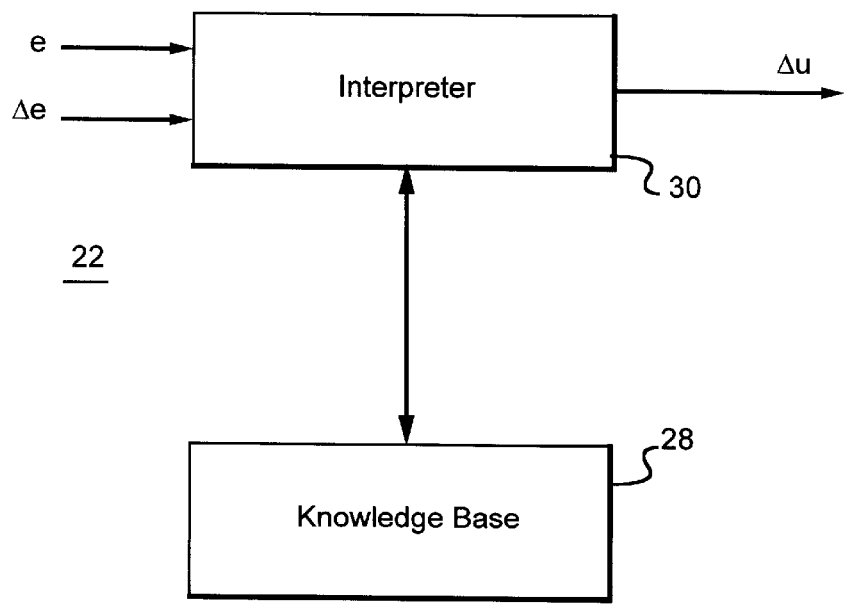
FIG. 3 shows a block diagram of a more detailed view of the fuzzy logic PI controller shown in FIG. 2.

FIG. 2 shows a block diagram of a more detailed view of the fuzzy logic controller 18. The fuzzy logic controller 18 comprises a fuzzy logic PI controller 22 that receives the tracking error e determined by the comparator 16 and change in tracking error Δe as determined by a delay element (i.e., a sample and hold) 24 and a summer 26 to generate incremental control actions Δu. The fuzzy logic PI controller as shown in FIG. 3 comprises a knowledge base 28 having a rule set, term sets, and scaling factors. The rule set maps linguistic descriptions of state vectors such as e and Δe into the incremental control actions Δu; the term sets define the semantics of the linguistic values used in the rule sets; and the scaling factors determine the extremes of the numerical range of values for both the input (i.e., e and Δe) and the output (i.e., Δe) variables. An interpreter 30 is used to relate the error e and the change in error Δe to the control action Δu according to the scaling factors, term sets, and rule sets in the knowledge base 28.

In this invention, each of the input variables (e and Δe) and the output variable (Δe) have a term set. The term sets are separated into sets of NH, NM, NL, ZE, PL, PM, PH, wherein N is negative, P is positive, H is high, M is medium, L is low, and ZE is zero. Accordingly, NH is negative high, NM is negative medium, NL is negative low, PL is positive low, PM is positive medium, and PH is positive high. Those skilled in the art will realize that there are other term sets that can be implemented with this invention. Each term set has a corresponding membership function that returns the degree of membership or belief, for a given value of the variable. Membership functions may be of any form, as long as the value that is returned is in the range of [0,1]. Initially, the terms are uniformly positioned trapezoids overlapping at a 50% level over the normalized universe of discourse as shown in FIG. 4.

Figures 4, 5:
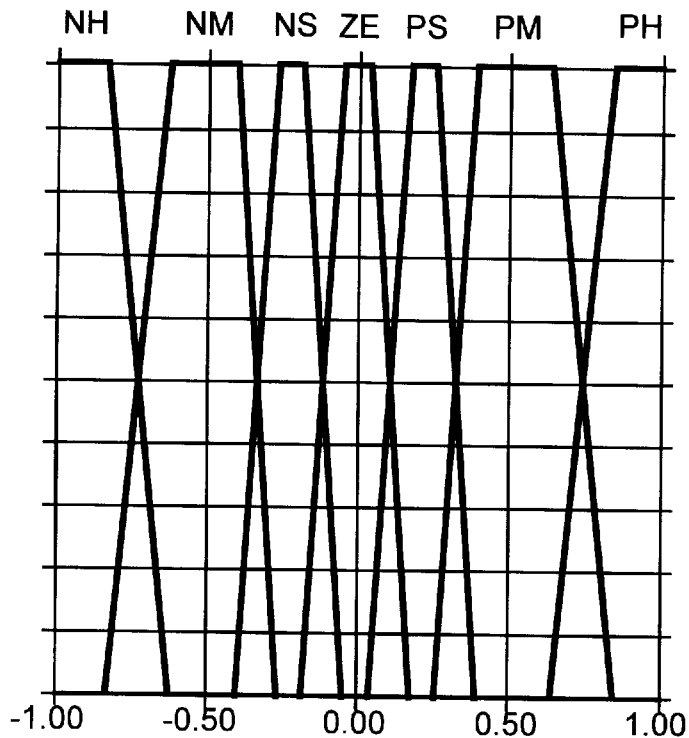
FIG. 4 shows an example of a fuzzy membership function used in this invention.
FIG. 5 shows an example of a rule set for the fuzzy logic PI controller.

An example of a rule set for the fuzzy logic PI controller 22 is shown in FIG. 5. As mentioned above, the rule set maps linguistic descriptions of the error e and the change in error Δe into the control action Δu. In FIG. 5, if e is NH and Δe is PH, then Δu will be ZE. Another example is if e is PL and Δe is NH, then Δu will be PM. Those skilled in the art will realize that there are other rule sets that can be implemented with this invention.

The relationship between the output variable U and the input variable e in the fuzzy logic PI controller 22 is expressed approximately as:

$$\frac{\Delta u(t)}{S_u} \approx \frac{\Delta e(t)}{S_d} + \frac{e(t)}{S_e} \quad (1)$$

$$u(t) \approx \frac{S_u}{S_d} \cdot e(t) + \frac{S_u}{S_e} \cdot \int e(t) \quad (2)$$

$$-S_e \leq e(t) \leq S_e \quad (3)$$

$$-S_d \leq \Delta e(t) \leq S_d \quad (4)$$

$$-S_u \leq \Delta u(t) \leq S \quad (5)$$

wherein $S_e$, $S_d$, $S_u$, are the scaling factors of the error e, the change of error Δe, and the incremental output variable Δu, respectively. The above relationship differs from a conventional PI controller which is defined as:

$$u(t) = K_p e(t) + K_i \int e(t) dt \quad (6)$$

wherein $K_p$ and $K_i$ are the proportional and integral gain factors, respectively. Comparing the fuzzy logic PI controller of this invention with the conventional PI controller results in the following:

$$K_p \approx \frac{S_u}{S_d} \text{ and } K_i \approx \frac{S_u}{S_e} \cdot \left(\frac{1}{dt}\right) \quad (7)$$

In this invention, the performance of the fuzzy logic PI controller 22 is tuned by the tuner 20. In particular, the tuner 20 uses a genetic algorithm to adjust the parameters (i.e., the scaling factors, membership functions, and rule sets in the knowledge base 28 in a sequential order of significance. A genetic algorithm is the name of a technique that is used to find the best solutions to complex multivariable problems. In one sense, a genetic algorithm represents a focused and progressive form of trial and error. Essentially, a genetic algorithm is a computer program that solves search or optimization problems by simulating the process of evolution by natural selection. Regardless of the exact nature of the problem being solved, a typical genetic algorithm cycles through a series of steps. First, a population of potential solutions is generated. Solutions are discrete pieces of data which have the general shape (e.g., the same number of variables) as the answer to the problem being solved. These solutions can be easily handled by a digital computer. Often, the initial solutions are scattered at random throughout the search space.

Next, a problem-specific fitness function is applied to each solution in the population, so that the relative acceptability of the various solutions can be assessed. Next, solutions are selected to be used as parents of the next generation of solutions. Typically, as many parents are chosen as there are members in the initial population. The chance that a solution will be chosen to be a parent is related to the results of the fitness of that solution. Better solutions are more likely to be chosen as parents. Usually, the better solutions are chosen as parents multiple times, so that they will be the parents of multiple new solutions, while the poorer solutions are not chosen at all. The parent solutions are then formed into pairs. The pairs are oft en formed at random, but in some implementations dissimilar parents are matched to promote diversity in the children.

Each pair of parent solutions is used to produce two new children. Either a mutation operator is applied to each parent separately to yield one child from each parent, or the two parents are combined using a cross-over operator, producing two children which each have some similarity to both parents. Mutation operators are probabilistic operators that try to introduce needed solution features in populations of solutions that lack such a feature. Cross-over operators are deterministic operators that capture the best features of two parents and pass it on to new off-spring solutions. Cross-over operations generation after generation ultimately combines the building blocks of the optimal solution that have been discovered by successful members of the evolving population into one individual.

The members of the new child population are then evaluated by the fitness function. Since the children are modifications of the better solutions from the preceding population, some of the children may have better ratings than any of the parental solutions. The child population i s then combine d with the original population that the parents came from to produce a new population. One way of doing this, is to accept the best half of the solutions from the union of the child population and the source population. Thus, the total number of solutions stays the same, but the average rating can be expected to improve if superior children were produced. Note that any inferior children that were produced will be lost at this stage, and that superior children will become the parents of the next generation in the next step. This process continues until a satisfactory solution (i.e., a solution with an acceptable rating according to the fitness function) has been generated. Most often, the genetic algorithm ends when either a predetermined number of iterations has been completed, or when the average evaluation of the population has not improved after a large number of iterations.

In this invention, the tuner 20 uses an off-the-shelf genetic algorithm known as GENESIS (GENEtic Search Implementation System). All that is needed is the fitness function. This invention uses three fitness functions which are:

$$f_i = \sum_i |notch_i - notch_{i-1}| + |brake_i - brake_{i-1}| \quad (8)$$

$$f_2 = \sum_i |v_i - v_i^d| \quad (9)$$

$$f_3 = w_1 \frac{\sum_i |notch_i - notch_{i-1}|}{K_1} + w_2 \sum_i \frac{|v_i - v_i^d|}{K_2} \quad (10)$$

wherein $v^d$ denotes the desired velocity and i is a distance or milepost. The fitness function $f_1$ captures the throttle notch jockeying, the fitness function $f_2$ captures the speed profile tracking accuracy, and the fitness function $f_3$ combines the weighted sum of fitness functions $f_1$ and $f_2$.

Figure 6:
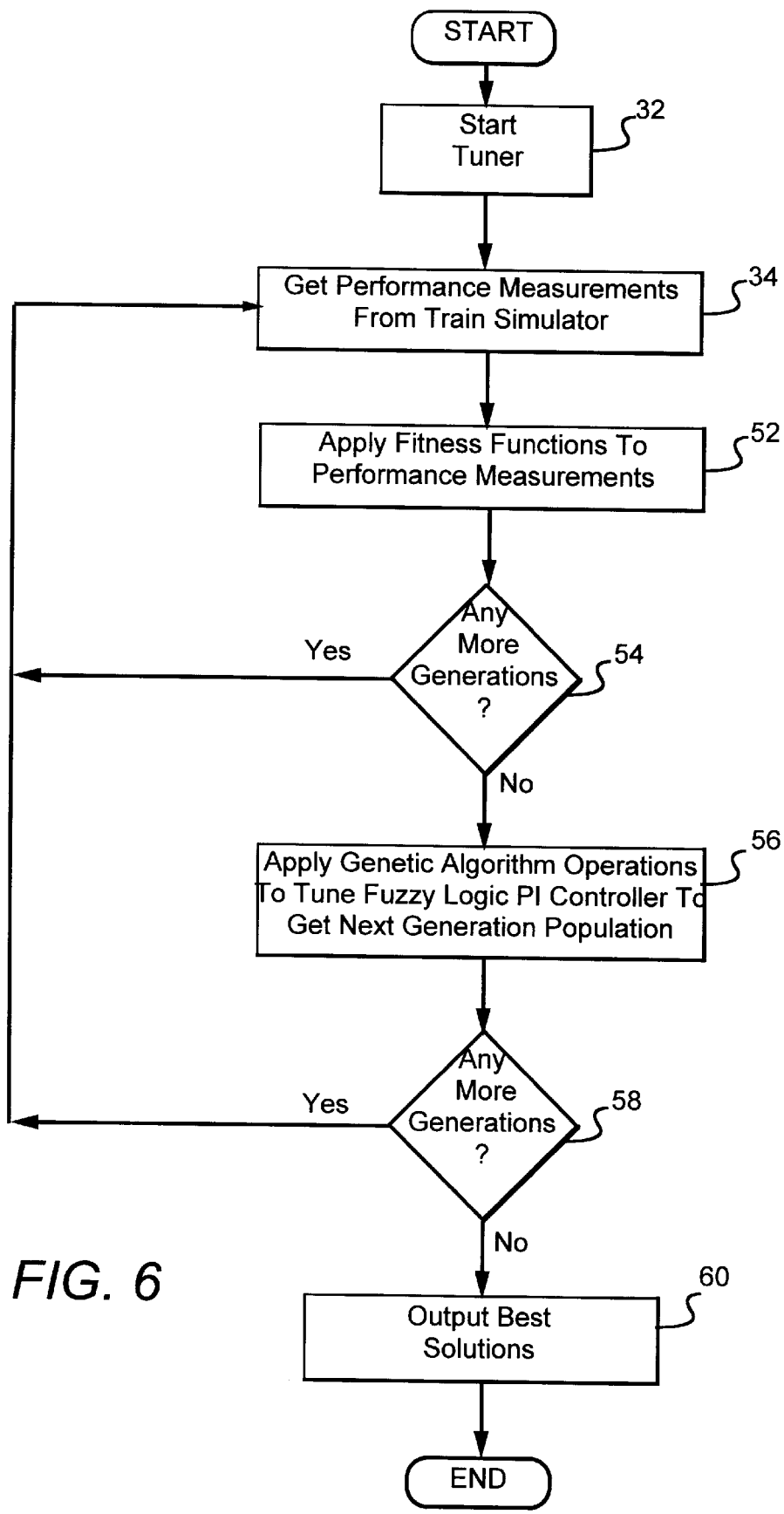
FIG. 6 shows a flow chart setting forth the processing steps performed by the tuner shown in FIG. 1.
Figure 7:
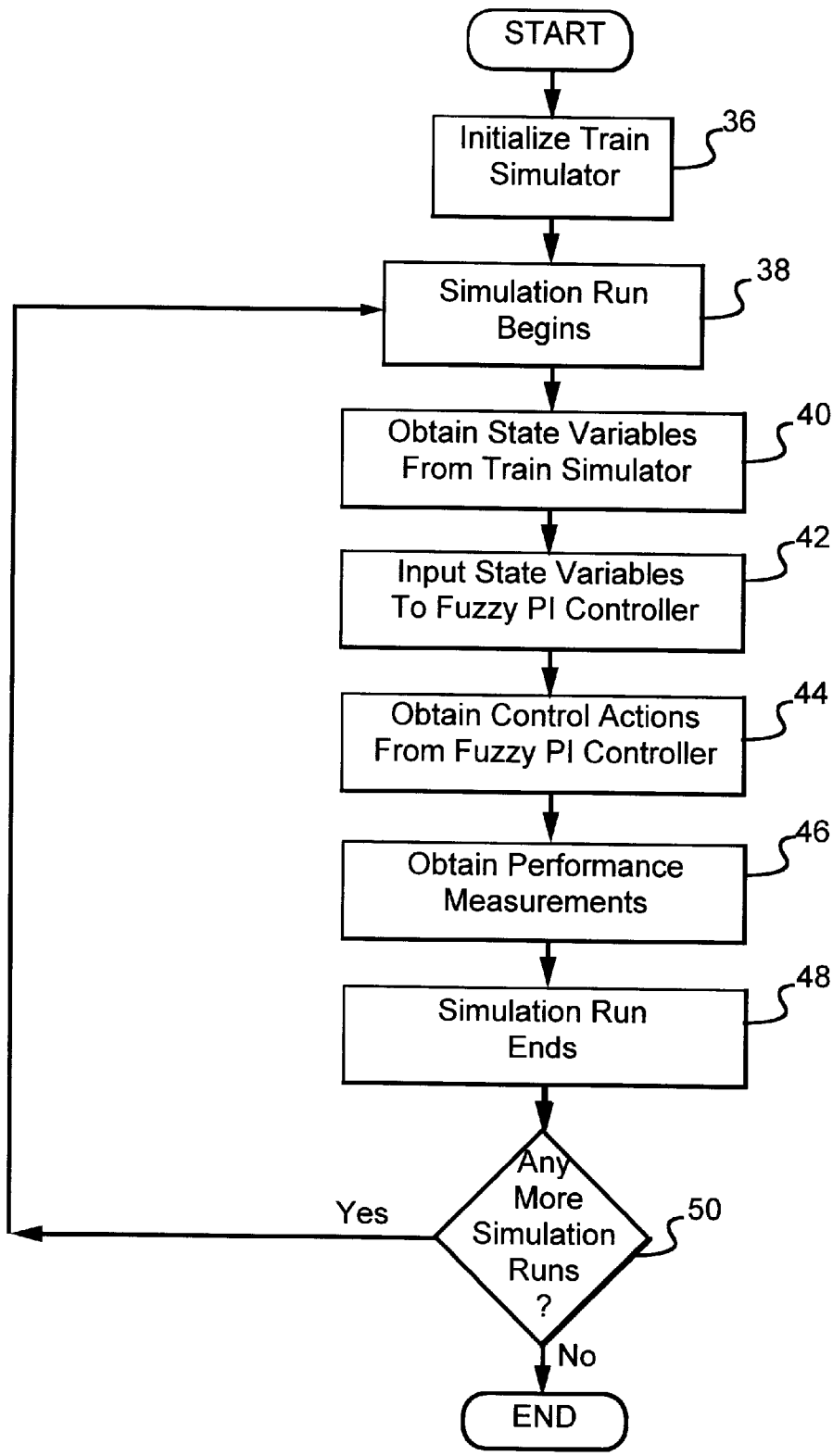
FIG. 7 shows a flow chart setting forth the processing steps in obtaining performance measurements.

FIG. 6 shows a flow chart setting forth the processing steps that are performed to tune the fuzzy logic PI controller 22. The tuner is started at 32 and performance measurements are retrieved at 34 from the train simulator. FIG. 7 shows how the performance measurements are obtained. Referring now to FIG. 7, the train simulator 14 is initialized for a journey over a specified track profile at 36. Next, a simulation run is begun at 38. At each simulator run, state variables are obtained from the train simulator 14 at 40. In this invention, the state variables are the speed of the train simulator and the position of the simulator with respect to the specified track profile. The state variables are then inputted to the fuzzy logic PI controller at 42. The fuzzy logic PI controller uses the inputted state variables to recommend a control action (i.e., a change in the throttle notch and braking settings) at 44. The performance of the train simulator 14 such as the fuel usage, the tracking error, and throttle notch jockeying are then obtained at 46 and stored in a log. The simulation run then ends at 48. If it is determined that there are more simulation runs left in the journey at 50, then processing steps 38–50 are continued until there are no longer any more simulation runs. Once it is determined that there are no more simulation runs, then the performance measurements are ready to be tuned by the tuner 20.

Referring back to FIG. 6, after the performance measurements have been obtained from the train simulator, then the tuner 20 applies the fitness functions $f_1$, $f_2$, and $f_3$ to the measurements at 52 for a predetermined number of generations and individuals. The fitness functions $f_1$, $f_2$, and $f_3$ are applied until it has been determined at 54 that there are no more generations left. Next, the genetic algorithm operations are applied at 56 to the fuzzy logic PI controller to get the next generation population. The genetic algorithm parameters for this invention such as the population size, the cross-over rate, and the mutation rate are set such that the population size is 50, the cross-over rate is 0.6, and the mutation rate is 0.001.

As mentioned above, the genetic algorithm operations are applied to the fuzzy logic controller in a sequential order of significance. In this invention, the scaling factors are tuned first since they have global effects on the rule sets in the knowledge base 28. In order to tune the scaling factors, each chromosome of a solution is represented as a concatenation of three 3-bit values for the three floating point values for the scaling factors $S_e$, $S_d$, and $S_u$. The ranges of the scaling factor are as follows:

$$S_e \in [1, 9]; \quad (11)$$

$$S_d \in [0.1, 0.9]; \text{ and} \quad (12)$$

$$S_u \in [1000, 9{,}000] \quad (13)$$

When tuning the membership functions, a chromosome is formed by concatenating the 21 parameterized membership functions for e, Δe, and Δu. Since each membership function is trapezoidal with an overlap degree of 0.5 between adjacent trapezoids, the universe of discourse is partitioned into intervals which alternate between being cores of a membership function and overlap areas. The core of negative high NH and positive high PH extend semi-infinitely to the left and right respectively outside of the [−1,1] interval. These intervals are denoted by $b_i$ and there are 11 intervals for the seven membership function labels. In general, the number of intervals is defined as:

$$\#(b) = 2 \times \#(MF) - 3 \quad (14)$$

wherein #(b) is the number of intervals and #(MF) is the number of membership functions. Each chromosome is thus a vector of 11 floating point values and therefore the universe of discourse is normalized as follows:

$$\sum_{i=1}^{11} b_i \leq 2 \qquad (15)$$

In addition, each interval $b_i$ is set within the range of [0.09, 0.18] and five bits are used to represent a chromosome for the genetic algorithm tuned membership functions. However, if $\Sigma_i b_i$ exceeds two, then the number of effective membership functions providing partial structure will still be optimized.

The genetic algorithm operations are applied until it has been determined at 58 that there are no more generations. If there are more genetic algorithm generations, then additional performance measurements are obtained from the train simulator 14 in the same manner described for FIG. 7. Once the additional performance measurements are obtained, then steps 52–58 in FIG. 6 are repeated until there are no more generations. Once the genetic algorithms have been applied to all of the generations, then the tuner 20 outputs the best solutions to the fuzzy logic PI controller at 60.

Figures 8A, 8B:
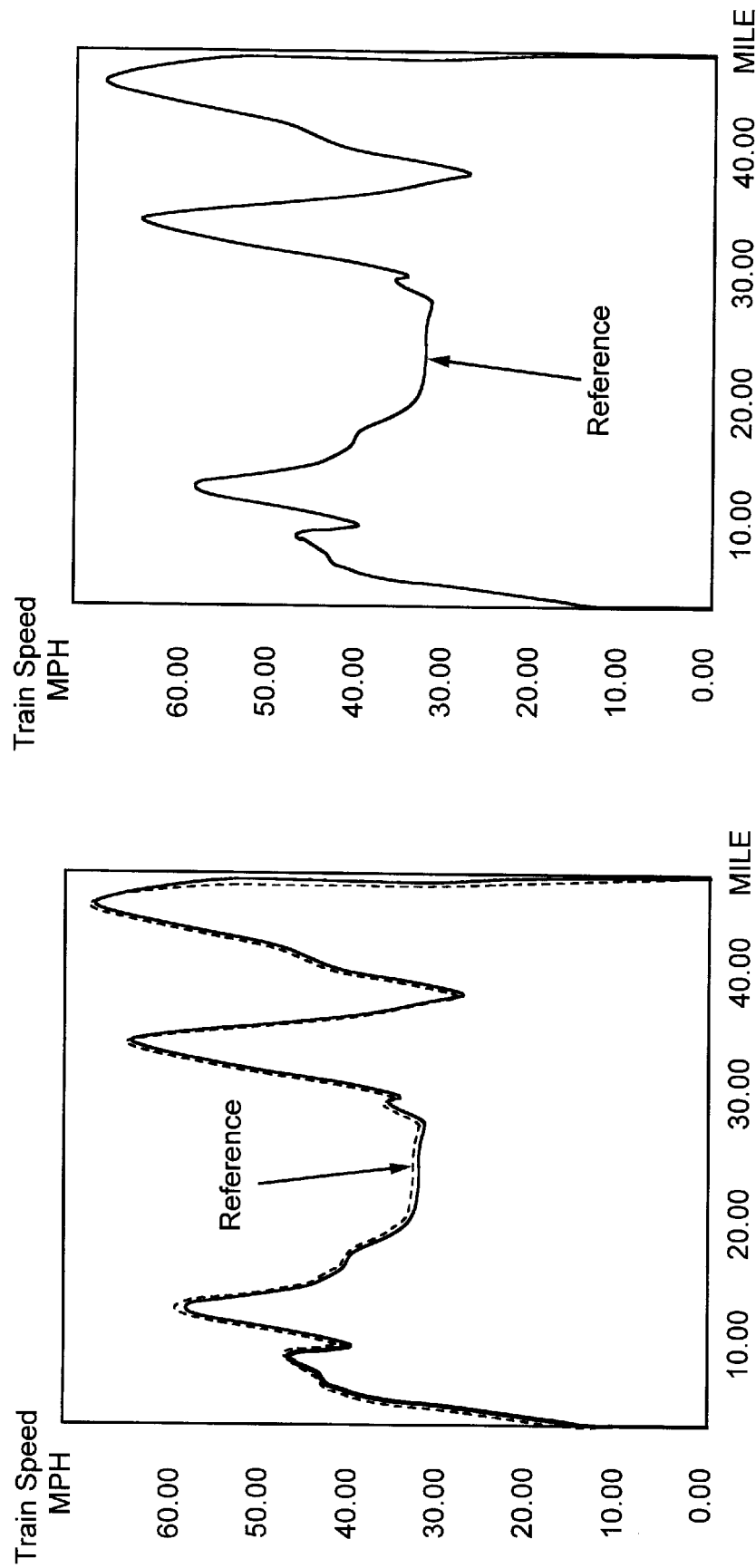
FIGS. 8a–8d show the performance of a fuzzy logic PI controller for a rail-based transportation system before tuning and after tuning.
Figure 8D:
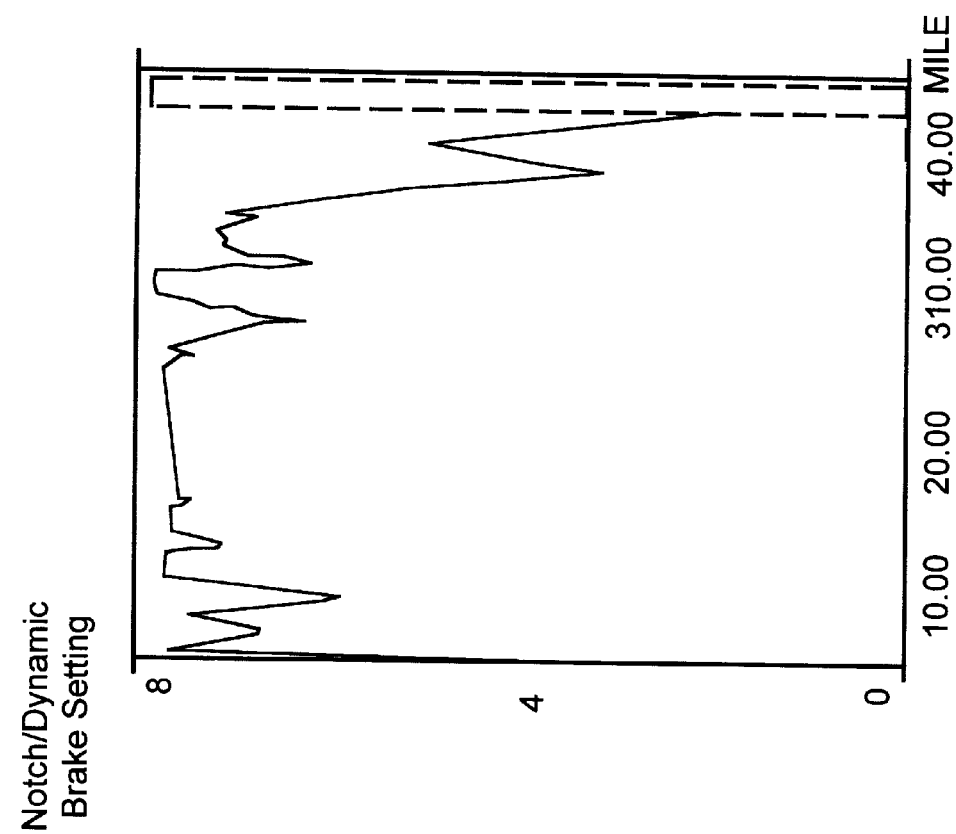
Figure 8C:
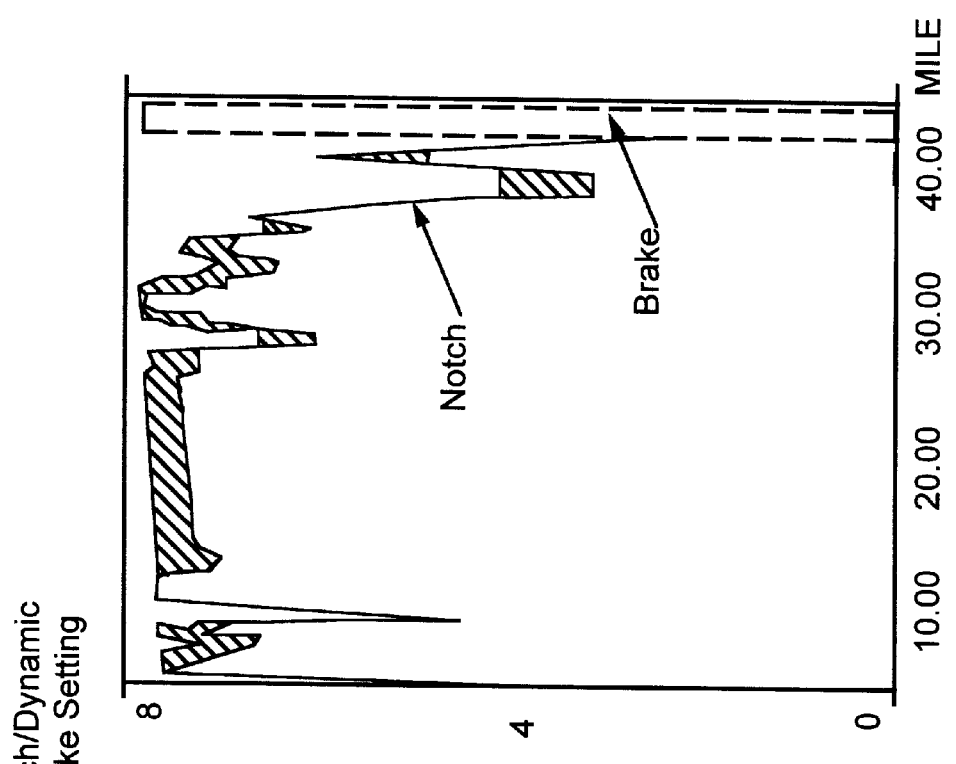

Tuning the fuzzy logic PI controller parameters in a sequential order of significance (i.e., scaling factors and membership functions) results in significant improvement in the controller's ability to track error and to generate smooth control actions. FIGS. 8a–8d show the performance of a fuzzy logic PI controller for a rail-based transportation system before tuning and after tuning. In particular, FIG. 8a shows the profile tracking of the fuzzy logic PI controller before tuning, while FIG. 8b shows the profile tracking after tuning. The tuned fuzzy logic PI controller results in a significant improvement in the tracking. FIG. 8c shows the control actions for the throttle notch and brake settings generated from the fuzzy logic PI controller before tuning, while FIG. 8d shows the throttle notch and brake settings after tuning. The abruptness in changes of the throttle notch and brake settings highlighted in FIG. 8c are not present after tuning as shown in FIG. 8d. The smoothness of the control actions is a vast improvement.

It is therefore apparent that there has been provided in accordance with the present invention, a system and method for tuning a rail-based transportation speed controller that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

We claim:

1. A system for tuning a rail-based transportation speed controller, comprising:
   a velocity profiler containing a predetermined velocity profile for operating a rail-based transportation system over a specified track profile;
   a train simulator for simulating an operation of the rail-based transportation system over the specified track profile;
   a fuzzy logic controller for controlling the velocity of the train simulator in accordance with the predetermined velocity profile provided by the velocity profile, the fuzzy logic controller tracking error and change in tracking error between the velocity of the train simulator and the predetermined velocity profile and providing a control action to the train simulator that minimizes the tracking error; and
   a tuner, coupled to the train simulator and the fuzzy logic controller, for optimizing the tracking between the train simulator and the predetermined velocity profile provided by the velocity profiler.

2. The system according to claim 1, wherein the fuzzy logic controller comprises a fuzzy logic knowledge base comprising scaling factors, membership functions, and rule sets defined for the tracking error, the change in tracking error, and the control action.

3. The system according to claim 2, wherein the fuzzy logic controller further comprises an interpreter for relating the tracking error and the change in tracking error to the control action according to the scaling factors, membership functions, and rule sets in the fuzzy logic knowledge base.

4. The system according to claim 3, wherein the control action is used to modify throttle notch and brake settings for the train simulator.

5. The system according to claim 4, wherein the fuzzy logic controller is a fuzzy logic proportional integral controller.

6. The system according to claim 2, wherein the tuner comprises a plurality of fitness functions for evaluating the operating performance of the train simulator.

7. The system according to claim 6, wherein the tuner further comprises a genetic algorithm for optimizing at least one of the scaling factors, membership functions, and rule sets in the fuzzy logic knowledge base according to the evaluations determined by the plurality of fitness functions.

8. The system according to claim 7, wherein the tuner further comprises an adjuster for adjusting the scaling factors, membership functions, and rule sets in the fuzzy logic knowledge base according to the optimization provided by the genetic algorithm.

9. A method for tuning a rail-based transportation speed controller, comprising:
   providing a predetermined velocity profile for operating a rail-based transportation system over a specified track profile;
   simulating an operation of the rail-based transportation system over the specified track profile;
   providing a fuzzy logic controller to control the velocity of the simulated operation in accordance with the predetermined velocity profile provided by the velocity profile, the fuzzy logic controller tracking error and change in tracking error between the velocity of the simulated operation and the predetermined velocity profile and providing a control action to the simulated operation that minimizes the tracking error; and
   tuning the fuzzy logic controller to optimize the tracking between the simulated operation and the predetermined velocity profile.

10. The method according to claim 9, wherein the step of providing the fuzzy logic controller comprises providing a fuzzy logic knowledge base comprising scaling factors, membership functions, and rule sets defined for the tracking error, the change in tracking error, and the control action.

11. The method according to claim 10, wherein the step of providing the fuzzy logic controller further comprises providing an interpreter for relating the tracking error and the change in tracking error to the control action according to the scaling factors, membership functions, and rule sets in the fuzzy logic knowledge base.

12. The method according to claim 11, further comprising the step of using the control action to modify throttle notch and brake settings for the simulated operation.

13. The method according to claim 12, wherein the step of providing a fuzzy logic controller comprises providing a fuzzy logic proportional integral controller.

14. The method according to claim 10, wherein the step of tuning comprises using a plurality of fitness functions for evaluating the operating performance of the simulated operation.

15. The method according to claim 14, wherein the step of tuning further comprises using a genetic algorithm for optimizing at least one of the scaling factors, membership functions, and rule sets in the fuzzy logic knowledge base according to the evaluations determined by the plurality of fitness functions.

16. The method according to claim 15, wherein the step of tuning further comprises adjusting the scaling factors, membership functions, and rule sets in the fuzzy logic knowledge base according to the optimization provided by the genetic algorithm.

* * * * *